INVENTOR.
LEONARD I. WOLFFE

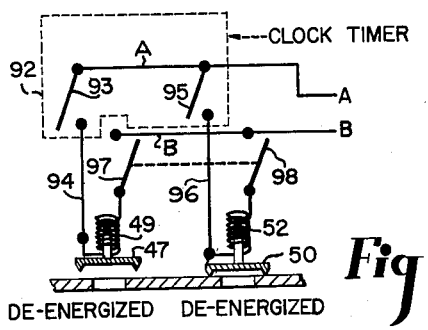
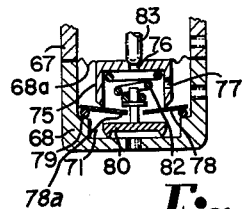
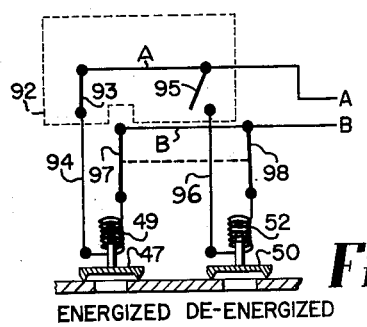
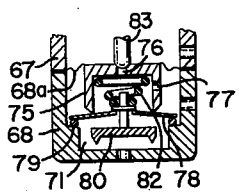
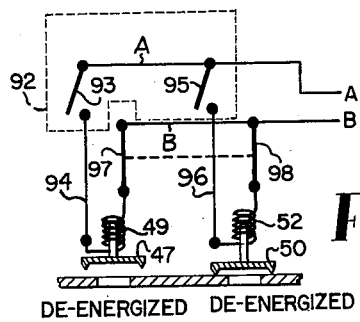
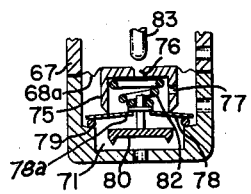
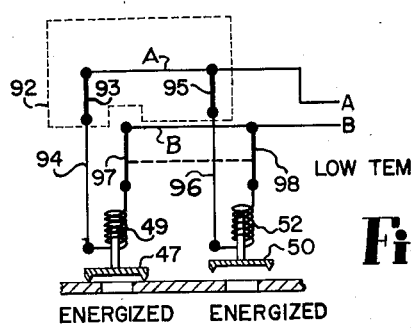

United States Patent Office 3,123,298
Patented Mar. 3, 1964

3,123,298
RANGE OVEN CONTROL SYSTEM AND
APPARATUS
Leonard I. Wolffe, Los Angeles, Calif., assignor to Minneapolis-Honeywell Regulator Company, Minneapolis, Minn., a corporation of Delaware
Filed Sept. 6, 1961, Ser. No. 136,357
5 Claims. (Cl. 236—46)

This invention relates to control apparatus for heating apparatus, such as an oven. While the broad inventive concept is adapted to control either an electric or a gas oven, the invention will be described as it is applied to gas ovens.

More particularly, the invention is directed to an oven wherein the control apparatus provides for automatically cooking food at a certain selected temperature and, thereafter, automatically lowering the temperature to a level wherein substantially no further cooking may take place, but the food may be maintained at a satisfactory warm temperature for eating.

One of the objects of the invention is to provide automatic control means for controlling an oven so as to automatically provide a cooking cycle followed by a temperature maintaining cycle at a preselected lower temperature.

Another object of the invention is to provide valve means for controlling the flow of gas to a gas burner heated oven wherein a gas valve embodies a diaphragm valve controlled by two on-off clock controlled valves and two thermostatic valves actuated by a single temperature responsive means.

A still further object of the invention is to provide a control device having two thermostatically operated controllers in series with two clock operated controllers so arranged that the operation of the control device through one or the other of the thermostatic controllers is determined by the clock operated controllers.

Still further objects of the invention will become apparent upon reading the following detailed description of the invention in conjunction with the accompanying drawing wherein:

FIGURE 2 is a schematic view of the solenoid valves of the invention and the controller clock with the associated switches thereof shown in the positions they assume with both solenoid valves de-energized;

FIGURE 3 is a view similar to that of FIGURE 2 but wherein the switches are in the positions which cause energization of one of the solenoid valves, the "off" or "plan ahead" position of the switches;

FIGURE 4 is a similar view to that of FIGURE 2 wherein manually operable switches are shown as being closed, meaning the system is in automatic operation condition;

FIGURE 5 is a view similar to that of FIGURE 2 wherein both solenoid valves are energized to reverse the valve positions as shown in FIGURES 2 and 4;

FIGURE 6 is a cross-sectional view showing one of the identical thermostatic valves with a snap acting valve and a modulating valve both closed;

FIGURE 7 is a view similar to that of FIGURE 6 wherein the snap acting valve is open and the modulating valve is closed; and FIGURE 8 is a view similar to that of FIGURES 6 and 7 wherein both the snap acting valve and the modulating valve are open.

Figure 1:
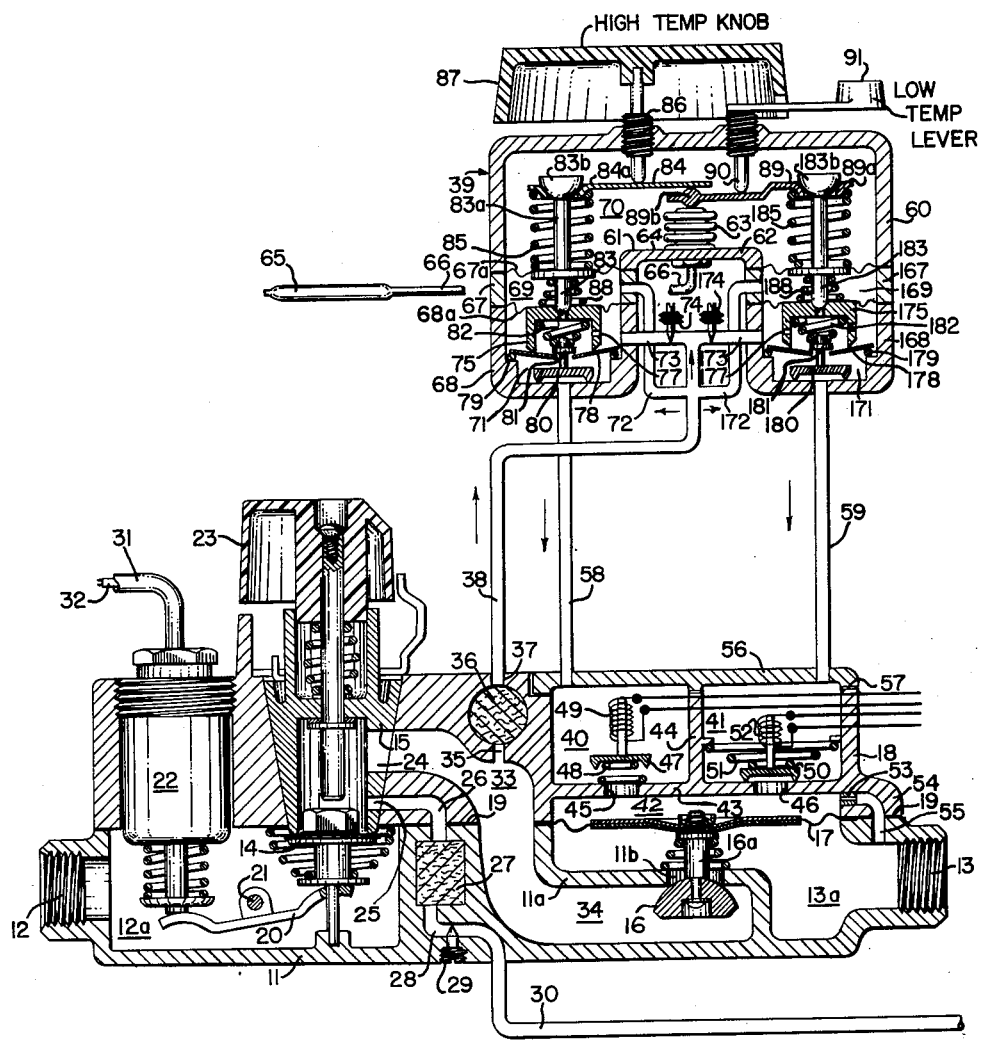
FIGURE 1 is a vertical sectional view through a manifold valve and its associated controller valves which, if desired, could be made integral with the manifold valve.

Referring to FIGURE 1 of the drawings, the control apparatus of this invention is illustrated as being a manifold valve having a main valve body 11, a threaded inlet 12 and a threaded outlet 13, a safety valve 14, a manually operable plug valve 15, and a gas flow control valve 16 between the other valves and said outlet. The valve 16 is connected by a valve stem 16a to a diaphragm 17. The periphery of the diaphragm 17 is clamped to the upper edge of an outlet cavity 13a by means of a cover casting 18, which is secured to the valve body 11 by means of bolts (not shown) or any other suitable means. A gasket 19 provides a gas tight seal between the upper casting 18 and the valve body 11.

A lever 20 is pivotally mounted intermediate its ends on a pivot 21 mounted in the side walls of an inlet cavity 12a, with one end thereof bearing against the valve 14 and the other end thereof bearing against the stem of a conventional thermocouple energized electromagnet 22.

As the details of the safety valve and the manually operable valve 15 form no part of this invention, it will suffice to say that these two valves are of the type which provide one-hundred percent safe lighting of a pilot burner associated with the main burner of the oven to be controlled by this invention. A manually operable knob 23 is adapted to slide axially of the plug valve 15 to reset the valve 14 in its open position and it is also adapted to rotate the plug valve 15 between "on," "pilot" and "off" positions. Besides having a main burner gas outlet 24 in the side wall of the valve 15, the valve also has an arcuate outlet 25 that registers with a pilot gas line 26 leading to a filter chamber 27 which, in turn, leads through a second passage 28, past an adjustable needle valve 29, to a conduit 30 adapted to be connected to a pilot burner (not shown). A thermocouple (not shown), adapted to be heated by the pilot burner, is connected to the electromagnet 22 through concentric leads 31 and 32. The outlet 24 is adapted to register with a passage 33 in the casting 18 with the passage 33 connecting with passage 34 that leads to a valve seat aperture 11b in the partition wall 11a through which valve stem 16a extends.

A passage 35 leads from the passage 33 to a filter 36 which, in turn, communicates through passage 37 with a conduit 38 which is adapted to be connected to a thermostatically operated control valve 39, to be presently described.

The valve casting 18 has two open-top cavities 40 and 41 therein which are separated from a cavity 42 above the diaphragm 17 by means of a partition wall 43 and separated from each other by means of a partition wall 44. An aperture 45 establishes communication between chamber 42 and chamber 40 while an aperture 46 establishes communication between chamber 42 and chamber 41. A valve 47, which cooperates with the opening 45 to control the flow of gas from chamber 40 to chamber 42, is normally biased open by means of coiled compression spring 48 and is adapted to be closed by energization of the coil 49. The valve 50, which is adapted to cooperate with the opening 46 to control gas flow from chamber 41 to chamber 42, is normally biased closed by means of a coiled compression spring 51 and is adapted to be opened by energization of the coil 52. The chamber 42 is in constant communication with the outlet chamber 13a through a bleed restricting orifice member 53 in bleed passage 54 and 55. The cavities 40 and 41 are closed by means of a plate 56 secured to the casting 18, with a gasket 57 therebetween, by means of bolts (not shown) or by any other suitable means. The chamber 40 communicates with the control valve 39 through a conduit 58 while the chamber 41 communicates with the control valve 39 through a conduit 59.

The control valve 39 consists of a housing 60 having two openings 61 and 62 in the lower side thereof and a bellows 63 mounted on a wall 64 between the openings 61 and 62. The fixed end of the bellows 63 communicates with a temperature responsive bulb 65 through a capillary tube 66. A cylinder 67 and a cup shaped member 68 are secured by bolts (not shown) below the opening 61 with a sealing diaphragm 67a between the housing 60 and cylinder 67 and a sealing diaphragm 68a between the cylinder 67 and the cup shaped member 68. The diaphragm 67a thus separates a chamber 69 between the two diaphragms 67a and 68a from a chamber 70 in the housing 60 in a chamber 71 in the cup shaped member 68. The conduit 38 communicates with the chamber 69 through a branchline or conduit 72 while the line 38 communicates with the chamber 71 through a branch conduit 73. An adjustable needle valve 74 regulates the rate of gas flow through conduit 73 into chamber 71.

Secured to the underside of diaphragm 68a, is an inverted, cup shaped valve seat member 75 having a central aperture 76 therein and a radial aperture 77 extending through a side wall thereof. The lower edge of the cup shaped member 75 bears against a washer shaped snap disc 78 intermediate the inner and outer diameters thereof. The outer periphery of the snap disc is pivoted on a ring 79 which, in turn, rests on a shoulder near the bottom of the cup shaped member 68. The inner end of an arm 78a, extending inwardly from the inner periphery or edge of the snap disc, is positioned between a disc valve 80 closing the upper end of the conduit 58 and an annular shoulder 81 intermediate the ends of the stem of the valve 80. A coil compression spring 82 normally biases the valve 80 into seating engagement with the inner surface of the cup shaped member 68, to close the upper end of the conduit 58.

The upper end of opening 76 is shaped into a valve seat and is normally closed by a valve 83 having a flange thereon secured to the diaphragm 67a. An extension 83a terminates in a headed portion 83b which is semispherical in shape and rests in a socket opening 84a of a lever 84. A coil compression spring 85 extends between the flange on the valve 83 and the underside of the socket portion 84a to normally bias the valve 83 against the valve seat in the member 75 to seal the opening 76. The lever 84 is pivotally mounted intermediate its ends on an adjustable screw 86 threaded through the top of the housing 60 and rotatable by a knob 87. The lower end of the screw 86 is rounded to provide a bearing surface and has a pin extension that passes through an opening in the lever 84 to help hold the lever in its assembled position.

The step opening valve assembly just described shows both the valve 80 and the valve 83 in their closed positions so that there is no gas flow from the conduit 38 through the branch conduits 73 and 72 and past said valves to the conduit 58 leading to the chamber 40. If the lever 84 is permitted to move clockwise about the pivot screw 86, any slack that may be present between the socket 84a and the headed portion 83b will first be taken up so that any further clockwise movement of the lever 84 will remove any bias of the spring 85 against the valve 83 to free the member 75 to follow the movement of the valve 83 under the bias of the spring 82 and the snap disc 78. When the valve 83 and the member 75 have moved sufficiently far to permit the snap disc 78 to snap over center to pick up the valve 80, gas will flow from the conduit 38, through aperture 77, past valve 80 to the chamber 40, and since the valve 47 is normally open, to the chamber 42. Since gas will flow into chamber 42 faster than it will flow out of the chamber through the orifice 53, the diaphragm 17 will move downwardly to open the valve 16 to a minimum flow position for ignition purposes. Further rotary movement of the lever 84 will cause the valve 83 to separate from the valve seat in the member 75 to additionally supply gas from the conduit 38, through passage 72, past the valve 83, through aperture 76 to the conduit 58 and chamber 40 to chamber 42, to additionally open the valve 16. The degree of opening of the valve 16 depends upon the degree of opening of the valve 83, providing a modulation of the valve 16 by the valve 83.

A thermostatic valve assembly substantially identical with that just described, is illustrated as being in the right hand side of the valve housing 60, with the comparable parts thereof designated by the same reference numerals with 100 added thereto. The oulet of the cup shaped member 168 is connected through the conduit 59 and through the chamber 41 to the chamber 42. The head 183b on the valve 183 rests in a socket 89a of a differently shaped pivoted lever 89, which is pivoted intermediate its ends on an adjustable pivot screw 90 screw threaded through an aperture in the top of the housing. The screw 90 carries an adjusting lever 91 on the upper outer end thereof. The lower end of the screw 90 is rounded to serve as a pivot for the lever 89 and has a pin thereon which extends through an aperture in the lever 89 for holding the lever 89 in its assembled position. The other end of the lever 89 has a ball shaped enlargement 89b thereon positioned to rest against the under surface of the lever 84b near its free end and against the upper end of the bellows at 63. It is thus seen that as the bellows 63 expands, the lever 89 will be rotated clockwise about the pivot 90 while the lever 84 will be rotated counterclockwise, simultaneously. When the bellows contracts, the lever 89 will rotate counterclockwise and the lever 84 will rotate clockwise. The operation of the right hand valves is different from that of the left hand valves in that the right hand valves open as the lever 89 rotates counterclockwise on the pivot 90. However, the valves on either side of the bellows 63 open when the bellows 63 contracts and close when the bellows expands but not necessarily at the same time. It is to be noted, however, that since the valve 50 is normally closed in the chamber 41, the opening of the valves 180 and 183 will not cause gas to flow to the chamber 42 unless the coil 52 of the valve 50 is energized.

The right hand valve assembly is the one which is used to provide low temperature control of the oven, for example, between 140 and 200 degrees Fahrenheit through an angular adjustment of approximately 30 degrees with a further angular adjustment of another 50 degrees to adjust the valve so that it would be in an off position at all times. The left hand valve assembly, which is adapted to provide high temperature control of the oven, is calibrated to cause temperature controlling between the temperatures 140 and 550 degrees Fahrenheit through an angular adjustment of approximately 270 degrees with further movement of this control knob to a position so as to have a complete off position for the associated valves. To provide for automatic and time controlled operation of the oven control valve, an electric clock or timer, generally designated by the reference numeral 92, has a switch 93 that is adapted to connect a power line "A" through a lead line 94 to the coil 49 of the high temperature solenoid valve 47 and a switch 95 adapted to connect the power line "A" to the coil 52 of the low temperature valve 50 through lead line 96. The other ends of the coils 49 and 52 are connected to the other power line "B" through manually operable switches 97 and 98, respectively, these switches being operated simultaneously to their closed and open positions.

The clock may be of any suitable construction so long as each of the valves 93 and 95 may be independently operated by suitable contact means in the clock timer to selectively energize or de-energize the coils 49 and 52 to cause the valves 47 and 50 to assume the various positions shown in FIGURES 2, 3, 4, and 5 at preselected times and time intervals. As the details of the timer form no part of this invention and as timers that can be adjusted to function as mentioned above are commercially available, it will suffice to say that any suitable clock timer may be used to control energization of the coils 49 and 52 as disclosed above and below.

Operation

The control apparatus for a gas oven is illustrated in FIGURE 1 of the drawing as being in a shut down condition. That is, the electromagnet 22 is in its de-energized condition with the spring on the armature stem biasing the lever 20 counterclockwise to hold the valve 14 against the lower end of the plug valve 15 against the bias of the spring tending to open the valve 14. The control knob 87 for the high temperature setting of the control apparatus is in its "off" position so that both valves 80 and 83 are closed to prevent the flow of gas to the diaphragm valve if gas were present in the passage 33. The control lever 91 is also in its "off" position so that both valves 180 and 183 are closed to prevent the flow of gas through the diaphragm chamber 42 if the valve were otherwise in operation. The normally closed valve 50 is also closed due to the fact that the coil 52 is de-energized, indicating that the clock timer is not in the condition necessary to cause closing of the switch 95 to energize the coil 52. Since no gas can flow to chamber 42, valve 16 is also closed.

Assuming that the manual switches are open and the clock timer is in the position which has switches 93 and 95 open, as in FIGURE 2 of the drawing, and it is desired to place the oven in operation to cook some food at 400 degrees Fahrenheit for one hour starting one hour hence and then have the food maintained at a temperature of 170 degrees for an additional hour, the high temperature control knob could be set to the desired cooking temperature, 400 degrees Fahrenheit, low temperature lever 91 would be set for the temperature 170. Both of these settings would cause the valves controlled by said knob and lever to move to their open positions as the bellows is at ambient temperatrue. However, no gas will flow to the diaphragm valve to cause opening of the valve 16 as the safety valve 14 is still closed. The manual switches 97 and 98 could then be closed and the clock timer could then be set to close switch 93 to energize coil 49 to close valve 47 and so adjusted that the switch 93 would open one hour hence. This would place the valves 47 and 50 in the position shown in FIGURE 3 of the drawing, a position which caintains the valve 16 closed. The clock timer would also be adjusted to leave the switch 95 open for two hours but so adjusted that at the end of that time, the switch would close to energize the coil 52 to open the valve 50 when the valve 47 is closed after having been open for one hour. The clock would also be set to cause opening of the switch 95 after it has been closed for one hour to terminate all heating of the food, that normally being the time after which the food has been served.

With all of the settings of the control valve knob and lever and clock timer switch controls properly adjusted, the burner is ignited by rotating the plug valve 15 to a "pilot" position, cutting off gas flow through the opening 24 to the passage 33, and then depressing the knob 23 to open the safety valve 14, simultaneously moving the armature (not shown) of the electromagnet 22 into engagement with the electromagnet (not shown), to cause gas to flow from the inlet 12, past safety valve 14, through arcuate slot 25, through filter 27, past regulator valve 29 and through conduit 30 to the pilot burner of the main burner. After the pilot burner has been ignited and a thermocouple heated thereby has energized the electromagnet 22, return movement of the knob 23 and rotation of the plug valve 15 to its "on" position, as shown in FIGURE 1 of the drawing, will cause gas to flow to the valve 16. However, since both valves 47 and 50 are closed, due to the prior setting of the clock timer, the valve 16 will remain closed and the main burner will not be ignited. The oven is thus placed under the automatic control of the apparatus to cause cooking to start one hour hence, cook for one hour at the high cooking temperature, then drop down to the lower temperature at which the food will be maintained warm until it is served during the next hour that the oven is operating at the preselected lower temperature of 170 degrees.

After one hour has been passed, the clock timer will cause the switch 93 to open and result in the opening of the valve 47 to cause gas flow past the valves 80 and 83 and valve 47 to the chamber 42 to open the valve 16 and thus supply gas to the main burner where it will be ignited and heat supplied to the oven. The amount of gas flowing to the main burner will be modulated by the temperature responsive bulb 65 in the oven, varying the position of the valve 83 with respect to the valve seat at the top of opening 76, the greater the flow of gas to the chamber 42, the wider open the valve 16 will be. The gas through the valve 16 may be modulated down to the point whereat the disc valve 80 snaps closed which will result in the quick closing of the valve 16. Should the temperature of the oven then rise again, the valve 16 will not open until the valve 80 has snapped open to supply a minimum flow rate of gas to the chamber 42 past the regulator valve 74 to cause the valve 16 to open quickly to a minimum flow rate for ignition purposes, that is to a rate which would not result in flashback.

After the one hour cooking period at the elevated temperature, the clock timer will cause closing of the valve 47 and opening of the valve 50 to switch the control of the valve 16 from the high temperature control valves 80 and 83 to the low temperature control valves 180 and 183. The low temperature control valves will then function in the same way as did the valves 80 and 83 but only at the lower temperature setting. FIGURE 4 shows the timer and electric valve arrangement for the high cooking cycle while FIGURE 5 shows the arrangement thereof for the low temperautre or holding temperature cycle.

To place the oven back on manual operation, all that is necessary is to open the manually operable switches 97 and 98, which are linked together to be operated simultaneously. This will retain the valves 47 and 50 in the position shown in FIGURE 2 of the drawing. If it is desired to leave the control knob and lever in their adjusted positions, and/or it is desired to leave the clock timer settings in their positions, but cut off the gas to the main burner, this may be done by rotating the plug valve 15 to its "pilot" position which will cut off the flow of gas to the main burner but still maintain an igniting flame at the pilot burner. If all gas flow is to be cut off, the plug valve may be rotated to its full "off" position which will take the arcuate groove 25 out of register with the passage 26, thus cutting off the flow of gas to the pilot burner as well as to the main burner.

From the above description, it is readily apparent that by the proper selection of the temperature control knob and lever and the proper setting of the clock timer for the control of the two switches, therein, it is possible to preplan when a cooking operation is to take place, the temperature at which the cooking will take place, the duration of that cooking period, and then maintain a preselected holding temperature for as long as desired to prevent overcooking yet maintain the food at a temperature that it may be desirably served.

As it is obvious that some modification could be made of the above described preferred embodiment of the invention without departing from the spirit thereof, it is to be understood that the scope of the invention is to be determined from the appended claims.

The embodiments of the invention in which an exclusive property or privilege is claimed are defined as follows:

1. Control apparatus comprising a valve body having an inlet and an outlet, a pressure operated valve between said inlet and outlet, a pressure chamber having a movable wall connected to said pressure operated valve, means providing a constantly open bleed passageway from said pressure chamber, a first passageway leading from said inlet to said pressure chamber, a first thermostatic valve and a first electrically operated valve in said passageway, a branch passageway communicating with said inlet and said pressure chamber, a second thermostatic valve and a second electrically operated valve in said branch passageway, first and second switches for controlling one each of said electrically operated valves, temperature responsive means operably connected to said thermostatic valves to cause opening and closing of one at a preselected temperature differential and the other at a preselected different temperature differential, and clock means for automatically operating said switches to provide a cooking period and a temperature holding period.

2. Oven control apparatus comprising a valve body having an inlet and an outlet, a pressure operated valve between said inlet and outlet, a pressure chamber having a movable wall connected to said pressure operated valve, means providing a constant bleed passageway from said pressure chamber, a passageway leading from said inlet to said pressure chamber, a first thermostatic valve and a first biased-open electrically operated valve in said passageway, a branch passageway communicating with said inlet and said pressure chamber, a second thermostatic valve and a second biased-closed electrically operated valve in said branch passageway, first and second switches for controlling one each of said electrically operated valves, temperature responsive means operably connected to said thermostatic valves to cause opening and closing of one at a preselected temperature differential and the other at a preselected different temperature differential, and clock means for automatically operating said switches to provide a cooking period and a temperature holding period.

3. In control apparatus for heat transfer means, the combination comprising fuel flow control means, single temperature responsive means for regulating said fuel flow control means, said temperature responsive means having first means adapted to regulate fuel flow at one rate to maintain a first preselected temperature and second means adapted to regulate fuel flow at another rate to maintain a second preselected different degree of said temperature, and clock controlled means including switches and valves for selectively rendering said first means or said second means operative or inoperative to provide operation of the heat transfer means so as to sequentially maintain said different temperatures for preselected periods of time.

4. Control apparatus for heat transfer means comprising first and second valves for controlling fuel flow, single condition responsive means for regulating said valves, said condition responsive means having first means adapted to regulate said first valve to maintain a first preselected condition and second means adapted to regulate said second valve to maintain a second preselected different degree of said condition, a biased open electrically operated valve in series with said first valve and a biased closed electrically operated valve in series with said second valve, and clock operated switch means for selectively rendering said electrically operated valves operative or inoperative to provide operation of the heat transfer means so as to sequentially maintain different degrees of said condition for preselected periods of time.

5. Oven control apparatus comprising a valve body having an inlet and an outlet, a pressure operated valve between said inlet and outlet, a pressure chamber having a movable wall connected to said pressure operated valve, means providing a constant bleed passageway from said pressure chamber to said outlet, a passageway leading from said inlet to said pressure chamber, a first thermostatic valve and a first electrically operated valve in said passageway, a branch passageway communicating with said inlet and said pressure chamber, a second thermostatic valve and a second electrically operated valve in said branch passageway, first and second switches for controlling one each of said electrically operated valves, temperature responsive means operably connected to said thermostatic valves to cause opening and closing of one at a preselected temperature differential and the other at a preselected different temperature differential, and clock means for automatically operating said switches to cause said electrically operated valves to be open sequentially to provide a cooking period and a temperature holding period.

References Cited in the file of this patent
UNITED STATES PATENTS

| | | |
|---|---|---|
| 1,650,889 | DeFlorez | Nov. 29, 1927 |
| 1,720,723 | Dodge | July 16, 1929 |